(12) United States Patent
Swartzlander, Jr. et al.

(10) Patent No.: US 8,161,090 B2
(45) Date of Patent: Apr. 17, 2012

(54) FLOATING-POINT FUSED ADD-SUBTRACT UNIT

(75) Inventors: Earl Swartzlander, Jr., Austin, TX (US); Jordan Hani Saleh, Austin, TX (US)

(73) Assignee: Crossfield Technology LLC, Austin, TX (US)

( * ) Notice: Subject to any disclaimer, the term of this patent is extended or adjusted under 35 U.S.C. 154(b) by 802 days.

(21) Appl. No.: 12/329,023

(22) Filed: Dec. 5, 2008

(65) Prior Publication Data

US 2010/0146022 A1    Jun. 10, 2010

(51) Int. Cl.
    *G06F 7/487* (2006.01)
(52) U.S. Cl. ......................................... 708/505
(58) Field of Classification Search ................ None
    See application file for complete search history.

(56) References Cited

U.S. PATENT DOCUMENTS

| | | | |
|---|---|---|---|
| 4,866,652 A | 9/1989 | Chu et al. | 364/748 |
| 4,943,940 A | 7/1990 | New | 364/748 |
| 5,646,875 A | 7/1997 | Taborn et al. | 364/748.14 |
| 5,732,007 A | 3/1998 | Grushin et al. | 364/748.11 |
| 5,796,644 A | 8/1998 | Jiang | 364/748.07 |
| 5,901,301 A | 5/1999 | Matsuo et al. | 395/388 |
| 5,928,316 A | 7/1999 | Wong et al. | 708/501 |
| 5,993,051 A | 11/1999 | Jiang et al. | 364/748.07 |
| 6,049,865 A | 4/2000 | Smith | 712/222 |
| 6,078,941 A | 6/2000 | Jiang et al. | 708/625 |
| 6,112,019 A | 8/2000 | Chamdani et al. | 395/390 |
| 6,311,261 B1 | 10/2001 | Chamdani et al. | 712/23 |
| 6,542,916 B1 | 4/2003 | Hinds et al. | 708/501 |
| 6,691,301 B2 | 2/2004 | Bowen | 717/114 |
| 6,751,644 B1 | 6/2004 | Chng et al. | 708/501 |
| 6,813,626 B1 | 11/2004 | Chng et al. | 708/501 |
| RE38,679 E | 12/2004 | Matsuo et al. | 712/212 |
| 6,904,446 B2 | 6/2005 | Dibrino | 708/501 |
| 7,254,698 B2 | 8/2007 | Schwarz et al. | 712/222 |
| 7,373,369 B2 | 5/2008 | Gerwig et al. | 708/505 |
| 7,451,172 B2 | 11/2008 | Powell, Jr. et al. | 705/501 |
| 2004/0267861 A1 | 12/2004 | Gerwig et al. | 708/670 |
| 2006/0101244 A1 | 5/2006 | Siu et al. | 712/221 |
| 2006/0179093 A1 | 8/2006 | Powell, Jr. et al. | 708/204 |
| 2007/0061389 A1 | 3/2007 | Hussain | 708/277 |
| 2008/0040584 A1 | 2/2008 | Hansen et al. | 712/222 |
| 2008/0059766 A1 | 3/2008 | Hansen et al. | 712/37 |
| 2008/0059767 A1 | 3/2008 | Hansen et al. | 712/37 |

(Continued)

OTHER PUBLICATIONS

Chris N. Hinds, "An Enhanced Floating Point Coprocessor for Embedded Signal Processing and Graphics Application," *Conference Record of the Thirty-Third Asilomar Conference on Signals, Systems, and Computers*, pp. 147-151, 1999.

(Continued)

*Primary Examiner* — David H Malzahn

(74) *Attorney, Agent, or Firm* — Cesari & Reed, LLP; R. Michael Reed

(57) ABSTRACT

In a particular embodiment, a method is disclosed that includes receiving first and second operands at a floating-point fused add-subtract circuit. The method further includes simultaneously performing add and subtract operations on the first and second operands via the floating-point fused add-subtract circuit to produce a sum result output and a difference result output. The floating-point fused add-subtract circuit includes sign logic, exponent adjustment logic, and shift logic that are shared by an add/round and post-normalize circuit and a subtract/round and post-normalize circuit to produce the sum and difference result outputs.

20 Claims, 6 Drawing Sheets

U.S. PATENT DOCUMENTS

| | | | |
|---|---|---|---|
| 2008/0065860 A1 | 3/2008 | Hansen et al. | 712/37 |
| 2008/0065862 A1 | 3/2008 | Hansen et al. | 712/222 |
| 2008/0072020 A1 | 3/2008 | Hansen et al. | 712/222 |
| 2008/0091758 A1 | 4/2008 | Hansen et al. | 708/501 |
| 2008/0091925 A1 | 4/2008 | Hansen et al. | 712/222 |
| 2008/0104375 A1 | 5/2008 | Hansen et al. | 712/220 |
| 2008/0104376 A1 | 5/2008 | Hansen et al. | 712/222 |
| 2008/0162882 A1 | 7/2008 | Hansen et al. | 712/210 |
| 2008/0177986 A1 | 7/2008 | Hansen et al. | 712/222 |
| 2011/0072066 A1* | 3/2011 | Lutz | 708/497 |

OTHER PUBLICATIONS

Ren-Cang Li, Sylvie Boldo and Marc Daumas, "Theorems on Efficient Argument Reductions," *Proceedings of the 16th IEEE Symposium on Computer Arithmetic*, pp. 129-136, 2003.

Arch D. Robison, "N-Bit Unsigned Division Via N-Bit Multiply-Add," *Proceedings of the 17th IEEE Symposium on Computer Arithmetic*, pp. 131-139, 2005.

Erdem Hokenek, Robert K. Montoye and Peter W. Cook, "Second-Generation RISC Floating Point with Multiply-Add Fused," *IEEE Journal of Solid-State Circuits*, vol. 25, No. 5, pp. 1207-1213, Oct. 1990.

*IEEE Standard for Binary Floating-Point Arithmetic*, ANSI/IEEE Standard 754, 1985.

Hani Saleh and Earl E. Swartzlander, Jr. "A Floating-Point Fused Add-Subtract Unit," 2008 IEEE Midwest Symposium on Circuits and Systems, Aug. 10-13, 2008, Knoxville, TN.

* cited by examiner

US 8,161,090 B2

FLOATING-POINT FUSED ADD-SUBTRACT UNIT

FIELD

The present disclosure is generally related to a floating-point fused add-subtract unit, and more particularly, but not by limitation to, a floating-point fused add-subtract unit that includes shared sign logic, shared exponent adjust logic, and shared shift logic to produce sum and difference result outputs.

BACKGROUND

In digital signal processors (DSPs) and other circuits, a sum and a difference may need to be calculated for a pair of operands for subsequent processing. For example, the sum and the difference may be used in Fast Fourier Transform (FFT) operations and Discrete Cosine Transform (DCT) butterfly operations. Conventionally, the sum and difference may be calculated serially, which limits throughput, or in parallel using two independent floating-point adders, which is expensive in terms of silicon area and power consumption. Hence, there is a need for improved add and subtract circuitry.

SUMMARY

In a particular embodiment, a method is disclosed that includes receiving first and second operands at a floating-point fused add-subtract circuit. The method further includes simultaneously performing add and subtract operations on the first and second operands via the floating-point fused add-subtract circuit to produce a sum result output and a difference result output. The floating-point fused add-subtract circuit includes sign logic, exponent adjustment logic, and shift logic that are shared by an add/round and post-normalize circuit and a subtract/round and post-normalize circuit to produce the sum and difference result outputs.

In another particular embodiment, a circuit device includes a first input to receive a first operand and a second input to receive a second operand. The circuit device further includes sign logic to receive sign bits associated with the first and second operands and to determine first and second sign output values and includes exponent difference and select logic to receive exponent bits from the first and second operands and to determine an exponent adjustment value and a shift control signal. The circuit device also includes first and second 2:1 multiplexers to select from the first and second operands to produce first and second values and includes a shift circuit adapted to shift the second value based on the shift control signal. Further, the circuit device includes an add/round and post-normalize circuit to add the first value and the shifted second value to produce a sum and to round and normalize the sum to produce a sum output and includes a subtract/round and post-normalize circuit to subtract the first value and the shifted second value to produce a difference and to round and normalize the difference to produce a difference output. The circuit device further includes logic to combine the first sign output value and the sum output to produce a sum result at a first output and to combine the second sign output value and the difference output to produce a difference result at a second output.

DETAILED DESCRIPTION OF ILLUSTRATIVE EMBODIMENTS

In a particular embodiment, a floating-point fused add-subtract unit is described that performs floating-point add and subtract operations on a pair of single-precision operands in about the same amount of time that it takes to perform a single addition operation using a conventional floating-point adder. In a particular example, the floating-point add and subtract operations can be performed simultaneously. When placed and routed in a 45 nm CMOS process, the floating-point fused add-subtract unit is only about 56% larger than a conventional floating-point adder and consumes less circuit area than a parallel implementation of an add-subtract unit.

Figure 1:
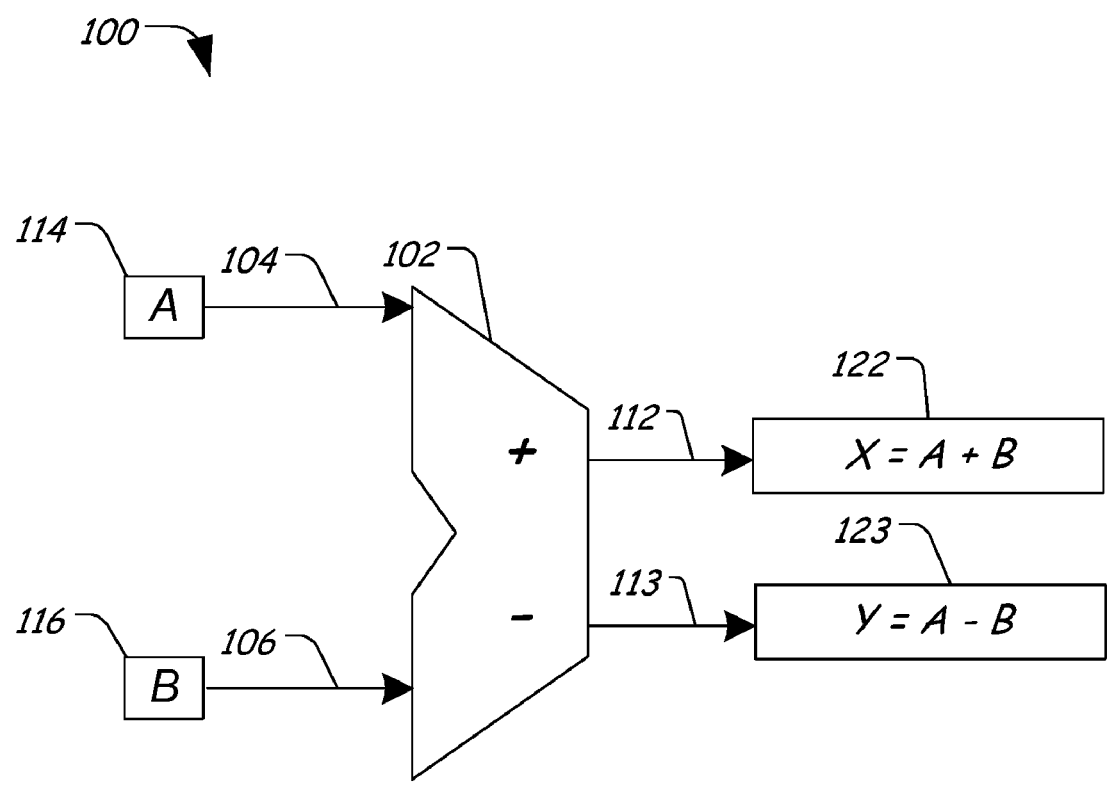
FIG. 1 is a diagram of a particular illustrative embodiment of a floating-point fused add-subtract unit.

FIG. 1 is a diagram of a particular illustrative embodiment of a floating-point fused add-subtract unit 100. The floating-point fused add-subtract unit 100 includes an add-subtract unit 102 that includes a first input 104 to receive a first operand 114 and that includes a second input 106 to receive a second operand 116. The add-subtract unit 102 further includes a first output 112 to provide a sum 122 of the first and second operands 114 and 116. The add-subtract unit 102 also includes a second output 113 to provide a difference 123 of the first and second operands 114 and 116. In a particular embodiment, the sum 122 and the difference 123 can be calculated from the first and second operands 114 and 116 simultaneously by sharing sign logic and exponent adjust logic.

Figure 2:
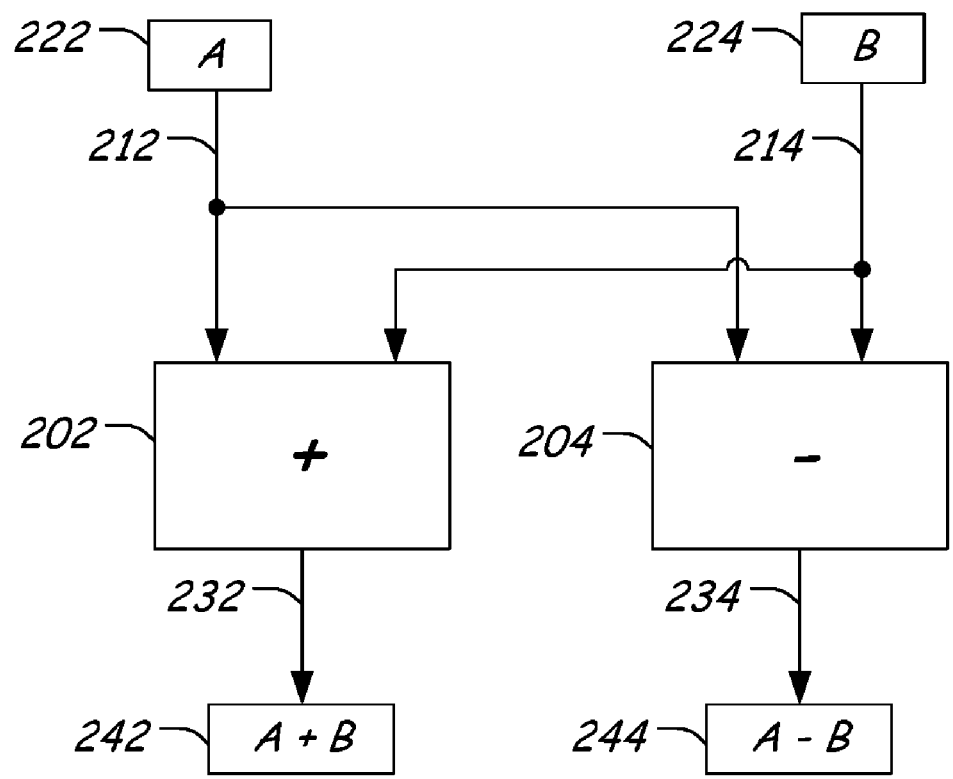
FIG. 2 is a block diagram of an embodiment of a parallel add-subtract circuit that includes two independent floating-point adders.

In conventional floating-point adders, the add and subtract functions can be performed in parallel using a parallel implementation, such as the implementation shown in FIG. 2. Alternatively, the add and subtract functions can be performed serially via a serial implementation, such as the implementation shown in FIG. 3.

FIG. 2 is a block diagram of an embodiment of a parallel add-subtract circuit 200 that includes independent floating-point adders, such as first and second adders 202 and 204. The first and second adders 202 and 204 are responsive to first and second inputs 212 and 214 to receive first and second operands 222 and 224. Further, the first and second adders 202 and 204 have first and second outputs 232 and 234 to provide a sum 242 and a difference 244 based on the first and second operands 222 and 224.

In this particular example, the first and second adders 202 and 204 are fully independent adder circuit implementations, doubling the circuit area of a single adder circuit. Further, the first and second adders 202 and 204 double the power consumed by a single adder. In this example, the parallel add-subtract circuit 200 incurs a large circuit area and power penalty.

Figure 3:
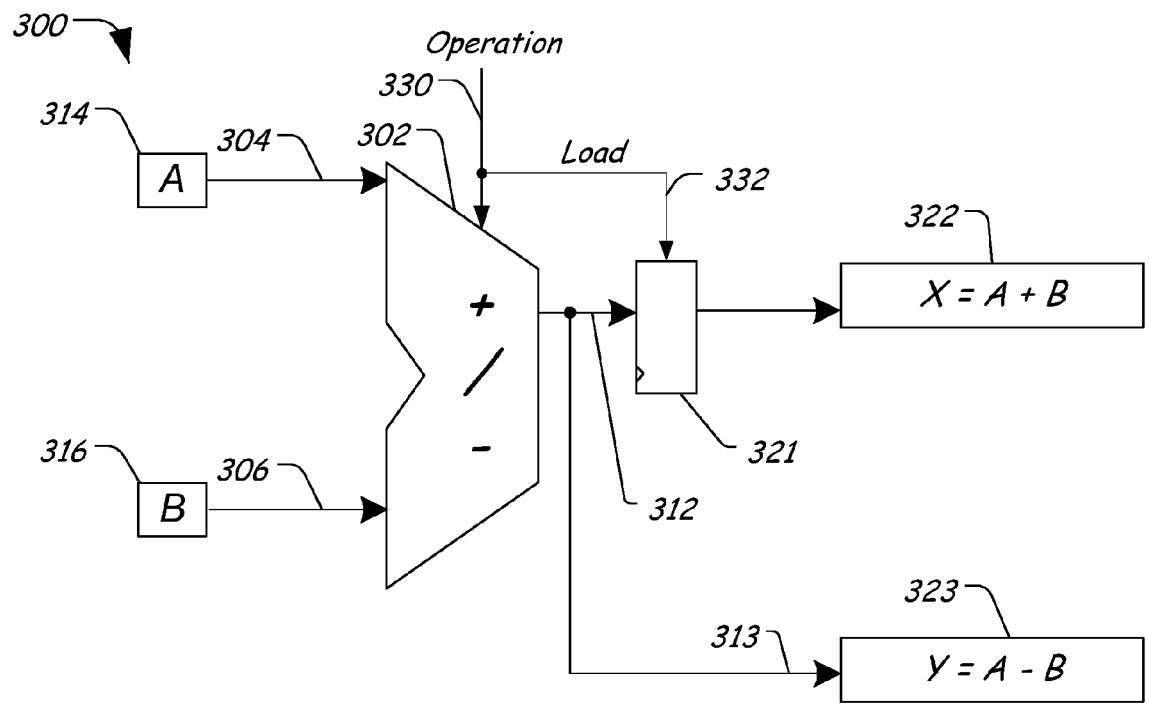
FIG. 3 is a block diagram of an embodiment of a serial add-subtract circuit that calculates a sum and a difference of two operands serially.

FIG. 3 is a block diagram of an embodiment of a serial add-subtract circuit 300 that calculates a sum and a difference of two operands serially. The serial add-subtract circuit 300 includes an adder 302. The adder 302 includes a first input 304 to receive a first operand 314 and a second input 306 to receive a second operand 316. The adder 302 includes an output 312 that is coupled to a latch circuit 321, which delays and outputs the sum 322. The output 312 of the adder is also adapted to provide a difference 323 via line 313. The adder 302 is responsive to an operation control signal 330 to control the adder 302 to either add or subtract the first and second operands 314 and 316. The latch circuit 321 is responsive to a load signal 332 to selectively load the output of the adder 302. In a particular embodiment, the operation control signal 330 and the load signal 332 can be coupled together so that the latch 321 is deactivated when the adder 302 is in a subtraction mode. The serial add-subtract circuit 300 uses the adder 302 twice (once adding and once subtracting) with the same operands, i.e., the first and second operands 314 and 316, incurring a relatively large latency penalty.

In Table 1 below, the circuit area and latency of the parallel and serial add-subtract circuits 200 and 300, illustrated in FIGS. 2 and 3, are compared to the fused add-subtract circuit 100, which is illustrated in FIG. 1.

TABLE 1

Comparison of Circuit Area and Latency for Conventional and Fused Add-Subtract Circuits.

| Circuit Approach | Circuit Area | Latency |
| --- | --- | --- |
| Conventional Parallel | 7,622 μm² | 1,644 ps |
| Conventional Serial | 3,811 μm² | 3,288 ps |
| Fused Add-Subtract | 5,947 μm² | 1,686 ps |

Table 1 illustrates that the fused add-subtract circuit approach implemented using a 45 nm CMOS technology is intermediate in area between the conventional serial and the conventional parallel approaches. Further, the latency of the fused add-subtract circuit approach is approximately the same as that of the conventional parallel approach and approximately half of that of the conventional serial approach. Based on the data from Table 1, the fused add-subtract circuit 100 of FIG. 1 utilizes less circuit area and performs the same operation within approximately the same period of time to produce both a sum and a difference from two input operands as compared to the parallel add-subtract unit 200 of FIG. 2 or uses approximately half the time to produce a sum and difference as compared to the serial add-subtract unit 300 of FIG. 3.

Figure 4:
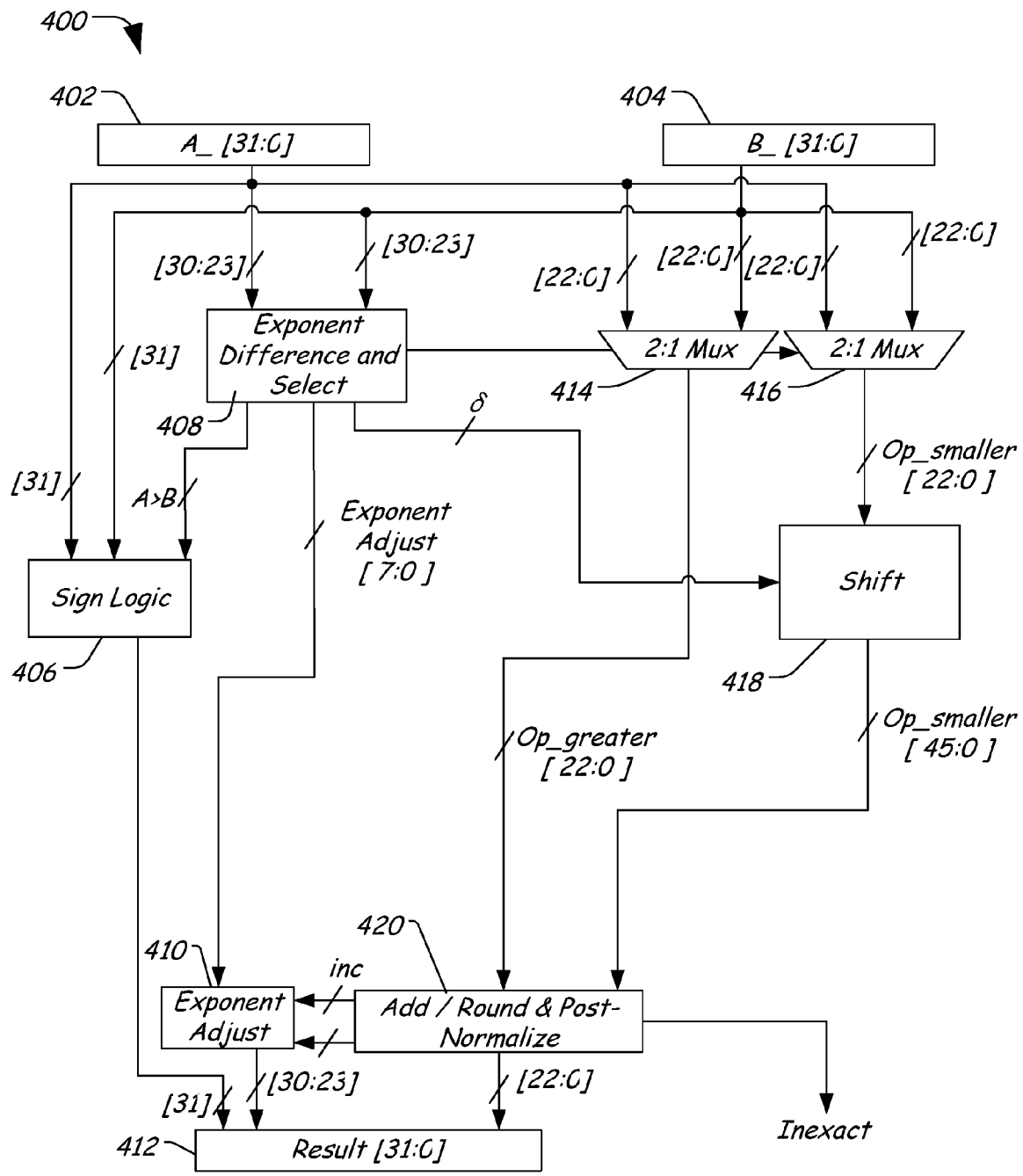
FIG. 4 is a block diagram of an embodiment of a floating-point adder circuit, such as the floating-point adders illustrated in FIG. 2.

FIG. 4 is a block diagram of an embodiment of a floating-point adder circuit 400, such as the floating-point adders 202 and 204 illustrated in FIG. 2 or the adder 302 illustrated in FIG. 3. The floating-point adder circuit 400 includes a first input 402 to receive a first operand and a second input 404 to receive a second operand. In a particular embodiment, the first and second operands can include thirty-two bits (i.e., bits [0:31]) and can be single-precision floating-point operands.

The floating-point adder circuit 400 includes sign logic 406 to receive a thirty-first bit (i.e., a sign bit) of each of the first and second operands 402 and 404. Additionally, the floating-point adder circuit 400 includes an exponent difference and select module 408 that receives bits thirty through twenty-three (i.e., bits [30:23] representing exponent bits) of the first and second operands 402 and 404. The exponent difference and select module 408 also provides a comparison value signal to the sign logic 406 indicating whether the first operand 402 is greater than the second operand 404 (i.e., operand A 402 is greater than operand B 404, A>B). The sign logic 406 uses the comparison value signal from the exponent difference and select module 408 to determine a sign and provides a sign output that represents a sign bit (bit [31]) of a result output 412. The exponent difference and select module 408 also provides an exponent adjustment signal, including an eight-bit word (exponent adjust [7:0]), to an exponent adjust circuit 410, which provides an exponent adjustment output representing output bits thirty to twenty-three (i.e., bits [30:23]) of the result output 412.

The exponent difference and select module 408 is coupled to a first multiplexer (e.g., a 2:1 multiplexer) 414 and to a second multiplexer (e.g., a 2:1 multiplexer) 416, which multiplexers produce a first significand (op_greater [22:0]) and a second significand (op_smaller [22:0]). The first 2:1 multiplexer 414 provides the first significand to an add/round and post-normalize circuit 420. The second 2:1 multiplexer 416 provides the second significand to a shift circuit 418, which receives a shift control signal from the exponent difference and select circuit 408. The shift circuit 418 shifts the second significand (op_smaller [22:0]) to produce a shifted significand (op_smaller [45:0]) that is provided to the add/round and post-normalize circuit 420. The add/round and post-normalize circuit 420 provides carry data to the exponent adjust circuit 410, produces an error output (i.e., "inexact" output), and produces an add/round and post-normalized output (i.e., bits [22:0]) to the result output 412. In a particular embodiment, logic combines the add/round and post-normalized output with the sign output and an exponent adjustment to produce the result output 412.

To perform a parallel add-subtract operation, the floating-point adder circuit 400 would need to be duplicated, which increases the circuit area used to perform the operation. To perform a serial add-subtract operation, floating-point adder circuit 400 would be used twice (serially) to perform an add operation and a subtract operation serially on the same operands, which serial usage increases the latency.

Figure 5:
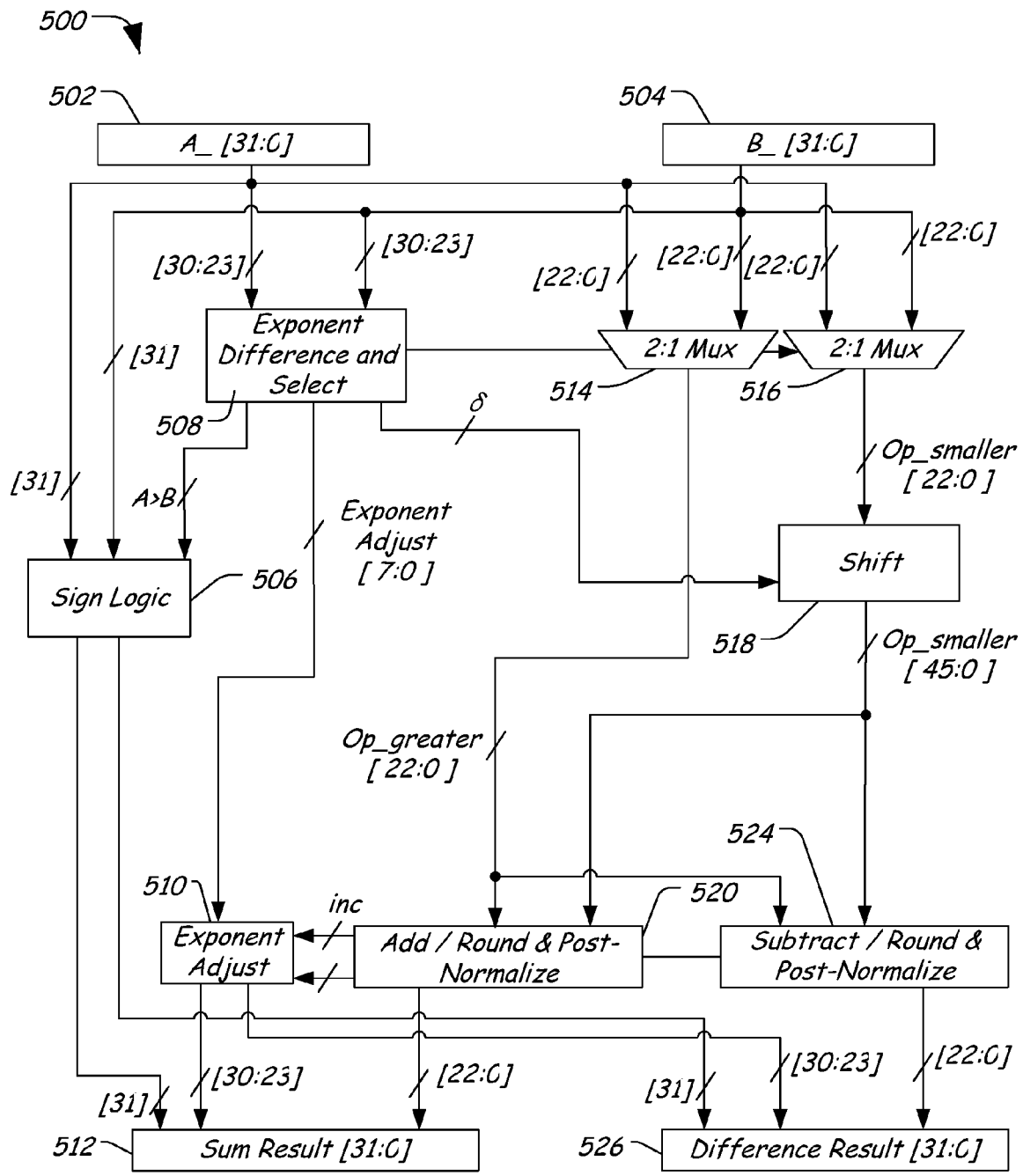
FIG. 5 is a block diagram of a particular illustrative embodiment of a floating-point fused add-subtract unit, such as the floating-point fused add-subtract unit illustrated in FIG. 1.

FIG. 5 is a block diagram of a particular illustrative embodiment of a floating-point fused add-subtract unit 500, such as the floating-point fused add-subtract unit 100 illustrated in FIG. 1. The fused floating-point adder circuit 500 includes a first input 502 to receive a first operand and a second input 504 to receive a second operand. In a particular embodiment, the first and second operands can include thirty-two bits (i.e., bits [0:31]).

The fused floating-point adder circuit 500 includes sign logic 506 to receive a thirty-first bit (i.e., a sign bit) of each of the first and second operands 502 and 504. Additionally, the fused floating-point adder circuit 500 includes an exponent difference and select module 508 that receives bits thirty through twenty-three (i.e., bits [30:23] that represent the exponents) of the first and second operands 502 and 504. The exponent difference and select module 508 also provides a comparison value signal to the sign logic 506 and to 2:1 multiplexers 514 and 516 indicating whether the first operand 502 is greater than the second operand 504 (i.e., operand A 502 is greater than operand B 504, A>B). The sign logic 506 utilizes the comparison value signal from the exponent difference and select module 508 to determine a sign and provides an output representing the sign to a first sign bit (bit [31]) of a first result output 512 and to a second sign bit (bit [31]) of a second result output 526. The exponent difference and select module 508 also provides an exponent adjustment signal, including an eight-bit word (exponent adjust [7:0]), to an exponent adjust circuit 510, which provides first and second exponent adjustment outputs representing exponent bits thirty to twenty-three (i.e., bits [30:23]) to the first and second result outputs 512 and 526.

The exponent difference and select module 508 is coupled to a first 2:1 multiplexer 514 and to a second 2:1 multiplexer 516, which multiplexers 514 and 516 produce a first significand (op_greater [22:0]) and a second significand (op_smaller [22:0]). The first 2:1 multiplexer 514 provides the first significand to an add/round and post-normalize circuit 520 and to a subtract/round and post-normalize circuit 524. The second 2:1 multiplexer 516 provides the second significand to a shift circuit 518, which receives a shift control signal from the exponent difference and select circuit 508. The shift circuit 518 shifts the second signficand (op_smaller [22:0 ]) according to the shift control signal to produce a shifted significand (op_smaller [45:0 ]) that is provided to the add/round and post-normalize circuit 520 and to the subtract/round and post-normalize circuit 524. The add/round and post-normalize circuit 520 adds the first significand and the shifted significand to produce a sum, provides carry data to the exponent adjust circuit 510, and produces an add/round and post-normalized output (i.e., a sum value represented by bits [22:0]) to the first result output 512. The subtract/round and post-normalize circuit 524 subtracts the shifted significand (op_smaller [45:0]) from the first significand (op_greater [22:0]) to produce a subtract/round and post-normalize output (i.e., a difference value represented by bits [22:0]) to the second result output 526. In a particular embodiment, the subtract/round and post normalize circuit 524 includes a twos complement circuit to complement the shifted significand (op_smaller [45:0]) related to the second significand (op_greater [22:0]).

In a particular embodiment, the sign logic 506, the exponent adjust circuit 510, and the shift output are shared by the add/round and post-normalize circuit 520 and the subtract/round and post-normalize circuit 524 to produce sum and difference output results 512 and 526, concurrently (or simultaneously). In this instance, the exponent difference, significand shift, and exponent adjustment operations can be performed once with a single set of hardware, and the results can be shared to perform both the add and subtract operations. In a particular embodiment, the circuit is placed and routed in a 45 nm CMOS process, and the resulting floating-point fused add-subtract circuit 500 uses approximately fifty-six percent (56%) more circuit area than a conventional floating-point adder to produce a sum and a difference value in the same time as a parallel (dual) floating-point adder implementation. In another particular embodiment, the floating-point fused add-subtract circuit 500 is adapted to operate on single-precision Institute of Electrical and Electronics Engineers (IEEE) Standard 754 operands (IEEE Std-754 operands). The use of a floating-point fused add-subtract circuit 500 accelerates the Fast Fourier Transform (FFT) and Discrete Cosine Transform (DCT) butterfly operations.

In a particular embodiment, the floating-point fused add-subtract circuit 500 is implemented using automatic synthesize, place, and route operations within a register transfer level (RTL) design. Further, in this embodiment, a 45 nm CMOS process is used for the implementation with a standard cell library designed for high speed applications. With this implementation, as indicated previously in Table 1, the floating-point fused add-subtract circuit 500 occupied an area of approximately 5,647 µm², as compared to a conventional serial floating-point add-subtract unit 200 using the same process and library that occupied 3,811 µm² and a conventional parallel floating-point add-subtract unit 300 using the same process and library that occupied 7,622 µm². Table 2 below illustrates power consumption characteristics for a conventional serial and parallel floating-point add-subtract units and a floating-point fused add-subtract circuit (FAS), such as the floating-point fused add-subtract circuit 500 illustrated in FIG. 5.

TABLE 2

Comparison of Power Consumption for Conventional and Fused Add-Subtract Circuits.

| Circuit Approach | Dynamic Power | Leakage Power | Total Power |
| --- | --- | --- | --- |
| Conventional Parallel | 2.03 mW | 0.57 mW | 2.60 mW |
| Conventional Serial | 1.01 mW | 0.29 mW | 1.30 mW |
| Fused Add-Subtract | 1.60 mW | 0.45 mW | 2.05 mW |

As shown in Table 2, the total power consumed by the floating-point fused add-subtract circuit is less than the power that would be consumed by the conventional parallel floating-point add-subtract circuit, but more than the power that would be consumed by the conventional serial floating-point add-subtract circuit. However, as discussed above with respect to Table 1, the floating-point fused add-subtract circuit is much faster than the conventional serial implementation and approximately the same speed as the conventional parallel implementation.

Figure 6:
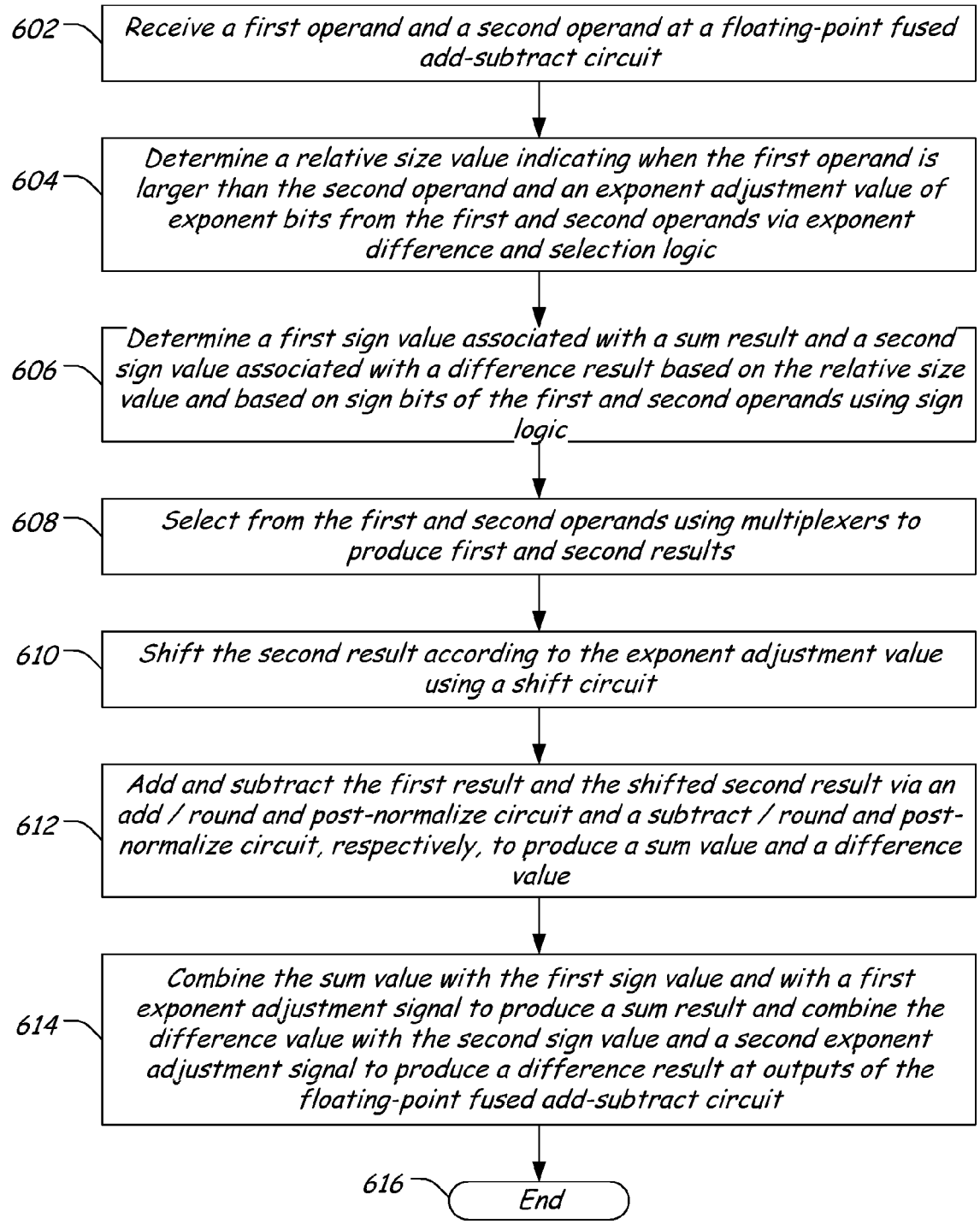
FIG. 6 is a flow diagram of a particular illustrative embodiment of a method of calculating a sum and a difference of two operands using a floating-point fused add-subtract unit.

FIG. 6 is a flow diagram of a particular illustrative embodiment of a method of calculating a sum and a difference of two operands using a floating-point fused add-subtract unit. At 602, first and second operands are received at a floating-point fused add-subtract circuit, such as the floating-point fused add-subtract circuit 500 illustrated in FIG. 5. In a particular embodiment, the first and second operands can be 32-bit floating-point numbers. Advancing to 604, a relative size value indicating when the first operand is larger than the second operand and an exponent adjustment value are determined from exponent bits of the first and second operands via exponent difference and selection logic. In a particular example, the relative size value indicates whether the first operand is larger than the second operand. Continuing to 606, a first sign associated with a sum result and a second sign associated with a difference result are determined based on the relative size value and based on sign bits of the first and second operands using sign logic. Proceeding to 608, the first and second operands are selected via 2:1 multiplexers to produce first and second results.

Moving to 610, the second result is shifted according to the exponent adjustment value using a shift circuit. Advancing to 612, the first result and the shifted second result are both added and subtracted via an add/round and post-normalize circuit and a subtract/round and post-normalize circuit, respectively, to produce a sum value and a difference value. Continuing to 614, the sum value is combined with the first sign value and with a first exponent adjustment signal to produce a sum result and the difference value is combined with the second sign value and a second exponent adjustment signal to produce a difference result at outputs of the floating-point fused add-subtract circuit. The method terminates at 616.

By sharing the sign logic, the exponent difference and selection logic, and the shift circuit, the sum and difference results can be calculated using an add/round and post normalize circuit and a subtract/round and post normalize circuit (in parallel) without duplicating the other circuitry. Further by sharing such components, the floating-point fused add-subtract circuit can produce both a sum result and difference result simultaneously, using approximately fifty-six percent (56%) more circuit area than a conventional adder circuit and only 2.5% more time than a conventional adder circuit In conjunction with the circuits and methods disclosed above with respect to FIGS. 1, 5 and 6, a floating-point fused add-subtract circuit is disclosed that performs simultaneous floating-point add and subtract operations on a pair of operands, such as single-precision floating-point operands. Further, by sharing sign logic, exponent difference and select logic, and a shift circuit, the floating-point fused add-subtract circuit can produce both sum and difference results from a pair of operands in approximately the same amount of time as two adder circuits can calculate the sum and difference in parallel, using less circuit area than two adder circuits.

Although the present invention has been described with reference to preferred embodiments, workers skilled in the art will recognize that changes may be made in form and detail without departing from the spirit and scope of the invention.

What is claimed is:

1. A method comprising:
receiving first and second operands at a floating-point fused add-subtract circuit; and
simultaneously performing add and subtract operations on the first and second operands via the floating-point fused add-subtract circuit to produce a sum result output and a difference result output;
wherein the floating-point fused add-subtract circuit includes sign logic, exponent adjustment logic, and shift logic that are shared by an add/round and post-normalize circuit and a subtract/round and post-normalize circuit to produce the sum and difference result outputs.

2. The method of claim 1, wherein simultaneously performing add and subtract operations comprises:
determining sum and difference sign bits from sign bits of each of the first and second operands via the sign logic;
determining an exponent adjustment value from exponent bits of each of the first and second operands via an exponent difference and select circuit; and
selecting data words from the first and second operands via 2:1 multiplexer circuits to produce first and second operands.

3. The method of claim 2, further comprising:
determining a shift value from the exponent bits via the exponent difference and select circuit; and
shifting the second operand based on the shift value to produce a shifted operand.

4. The method of claim 3, further comprising:
adding the first operand and the shifted operand to produce a sum result; and
subtracting the shifted operand from the first operand to produce a difference result.

5. The method of claim 4, further comprising:
determining a sum sign output and a difference sign output based on the sign bits via the sign logic;
determining a sum exponent output and a difference exponent output based on the exponent adjustment value via the exponent difference and select circuit;
combining the sum sign output, the sum exponent output, and the sum result to produce the sum result output; and
combining the difference sign output, the difference exponent output, and the difference result to produce the difference result output.

6. A circuit device comprising:
a first input to receive a first operand;
a second input to receive a second operand;
sign logic to receive sign bits associated with the first and second operands and to determine first and second sign output values;
exponent difference and select logic to receive exponent bits from the first and second operands and to determine an exponent adjustment value and a shift control signal;
first and second 2:1 multiplexers to select from the first and second operands to produce first and second values;
a shift circuit adapted to shift the second value based on the shift control signal;
an add/round and post-normalize circuit to add first value and the shifted second value to produce a sum and to round and normalize the sum to produce a sum output;
a subtract/round and post-normalize circuit to subtract the first value and the shifted second value to produce a difference and to round and normalize the difference to produce a difference output;
logic to combine the first sign output value and the sum output to produce a sum result at a first output and to combine the second sign output value and the difference output to produce a difference result at a second output.

7. The circuit device of claim 6, wherein the subtract/round and post-normalize circuit comprises a twos complement circuit adapted to complement the shifted second value.

8. The circuit device of claim 6, wherein the sum result and the difference result are produced concurrently.

9. The circuit device of claim 6, wherein the sum result and the difference result are provided to the first and second outputs concurrently.

10. The circuit device of claim 6, further comprising an exponent adjustment circuit to receive the exponent adjustment value and to produce a first exponent output and a second exponent output;
wherein the sum result includes the first exponent output; and
wherein the difference result includes the second exponent output.

11. The circuit device of claim 10, wherein the exponent adjustment circuit, the sign logic, the exponent difference and select logic, and the shift circuit are shared by the add/round and post-normalize circuit and the subtract/round and post-normalize circuit.

12. The circuit device of claim 10, wherein the add/round and post-normalize circuit and the subtract/round and post-normalize circuit are coupled to the exponent adjustment circuit to selectively increment the first and second outputs.

13. The circuit device of claim 6, wherein the first and second operands comprise thirty-two bit, single-precision, floating-point operands.

14. A fused add-subtract unit comprising:
first and second multiplexers to receive first and second operands and to produce a first value and a second value;
an add/round and post-normalize circuit to add the first value and a shifted value related to the second value to produce a sum and to round and normalize the sum to produce a sum result;
a subtract/round and post-normalize circuit to subtract the shifted value from the first value to produce a difference and round and normalize the difference to produce a difference result;
an exponent difference and select circuit to receive first and second exponents from first and second operands and to determine an exponent comparison value and an exponent output value;
sign logic to receive first and second sign bits of first operand and second operands and to produce a sum sign and a difference sign based on the first and second sign bits and an exponent comparison value; and an exponent adjust circuit to receive the exponent output value and to produce a sum exponent and a difference exponent.

15. The fused add-subtract unit of claim 14, further comprising logic to combine the first sign bit, the sum exponent, and the sum result to produce a sum result output and to combine the second sign bit, the difference exponent, and the difference result to produce a difference result output.

16. The fused add-subtract unit of claim 14, wherein the exponent difference and select circuit is adapted to produce a shift control output related to the first and second exponents, and further comprising:
 a shift circuit to receive the second value and to shift the second value to produce the shifted value based on the shift control output from the exponent difference and select circuit.

17. The fused add-subtract unit of claim 14, wherein the first and second multiplexers comprise 2:1 multiplexer circuits.

18. The fused add-subtract unit of claim 14, wherein the first and second operands comprise thirty-two bit, single-precision, floating-point operands.

19. The fused add-subtract unit of claim 14, wherein the subtract/round and post-normalize circuit comprises a twos complement circuit adapted to complement the shifted value.

20. The fused add-subtract unit of claim 14, wherein the sign logic, the exponent adjust circuit, and the shift circuit are shared by the add/round and post-normalize circuit and the subtract/round and post-normalize circuit.

* * * * *